United States Patent
Saxena et al.

(10) Patent No.: US 7,412,507 B2
(45) Date of Patent: Aug. 12, 2008

(54) EFFICIENT CASCADED LOOKUPS AT A NETWORK NODE

(75) Inventors: Apoorv Saxena, Santa Clara, CA (US); Apurva Mehta, Cupertino, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 942 days.

(21) Appl. No.: 10/346,407

(22) Filed: Jan. 16, 2003

(65) Prior Publication Data
US 2003/0225881 A1 Dec. 4, 2003

Related U.S. Application Data

(60) Provisional application No. 60/385,919, filed on Jun. 4, 2002.

(51) Int. Cl.
*G06F 15/173* (2006.01)
(52) U.S. Cl. ............................. 709/224; 707/3; 707/4; 707/5; 707/6
(58) Field of Classification Search ........................ None
See application file for complete search history.

(56) References Cited

U.S. PATENT DOCUMENTS

| | | | |
|---|---|---|---|
| 5,930,359 A * | 7/1999 | Kempke et al. | 713/160 |
| 5,938,736 A | 8/1999 | Muller et al. | |
| 6,377,577 B1 | 4/2002 | Bechtolsheim et al. | |
| 6,535,951 B1 * | 3/2003 | Ross | 711/108 |
| 6,606,681 B1 * | 8/2003 | Uzun | 711/108 |
| 6,658,002 B1 * | 12/2003 | Ross et al. | 370/392 |
| 6,738,862 B1 * | 5/2004 | Ross et al. | 711/108 |
| 6,792,502 B1 * | 9/2004 | Pandya et al. | 711/108 |
| 6,826,180 B1 * | 11/2004 | Bergantino et al. | 370/389 |
| 6,862,281 B1 * | 3/2005 | Chandrasekaran | 370/392 |
| 7,002,965 B1 * | 2/2006 | Cheriton | 370/395.32 |
| 7,012,890 B2 * | 3/2006 | Yazaki et al. | 370/229 |
| 7,024,515 B1 * | 4/2006 | Ruan et al. | 711/108 |

* cited by examiner

*Primary Examiner*—Bunjob Jaroenchonwanit
*Assistant Examiner*—Duyen M Doan (57) ABSTRACT

Performing cascading lookups at a network node involves using first header information from a packet to search a first set of search criteria for a match, identifying a tag associated with the match, and using second header information from the packet and the tag to search a second set of search criteria for another match.

24 Claims, 7 Drawing Sheets

L3 Lookup Table

| Source IP Address | Dest IP Address |
|---|---|
| XXXXX | 10.1.1.1 |
| XXXXX | 11.1.1.1 |
| XXXXX | 12.1.1.1 |
| XXXXX | 13.1.1.1 |
| XXXXX | 17.1.1.1 |
| XXXXX | 19.1.1.1 |
| ... | ... |

Associated Data

| Pointer |
|---|
| W |
| X |
| Y |
| Z |
| M |
| N |
| ... |

FIG. 2 (PRIOR ART)

L4 Lookup Table

| Source IP Address | Dest. IP Address | Source Socket | Dest Socket |
|---|---|---|---|
| XXXXX | 10.1.1.1 | A | B |
| XXXXX | 10.1.1.1 | A | C |
| XXXXX | 10.1.1.1 | A | D |
| XXXXX | 11.1.1.1 | A | B |
| XXXXX | 11.1.1.1 | A | C |
| XXXXX | 11.1.1.1 | A | D |
| XXXXX | 12.1.1.1 | A | B |
| XXXXX | 12.1.1.1 | A | C |
| XXXXX | 12.1.1.1 | A | D |
| XXXXX | 13.1.1.1 | A | B |
| XXXXX | 13.1.1.1 | A | C |
| XXXXX | 13.1.1.1 | A | D |
| XXXXX | 17.1.1.1 | B | E |
| XXXXX | 17.1.1.1 | B | F |
| XXXXX | 19.1.1.1 | B | E |
| XXXXX | 19.1.1.1 | B | F |
| ... | ... | ... | ... |

Associated Data

| Traffic Info |
|---|
| H |
| I |
| J |
| H |
| I |
| J |
| H |
| I |
| J |
| H |
| I |
| J |
| K |
| L |
| K |
| L |
| ... |

FIG. 3 (PRIOR ART)

L3 Lookup Table

| Source IP Address | Dest IP Address |
|---|---|
| XXXXX | 10.1.1.1 |
| XXXXX | 11.1.1.1 |
| XXXXX | 12.1.1.1 |
| XXXXX | 13.1.1.1 |
| XXXXX | 17.1.1.1 |
| XXXXX | 19.1.1.1 |
| ... | ... |

Associated Data

| Pointer | Tag |
|---|---|
| W | 3 |
| X | 3 |
| Y | 3 |
| Z | 3 |
| M | 5 |
| N | 5 |
| ... | ... |

FIG. 5

L4 Lookup Table

| Source IP Address / Dest. IP Address | Source Socket | Dest Socket | Tag |
|---|---|---|---|
| XXXXX | A | B | 3 |
| XXXXX | A | C | 3 |
| XXXXX | A | D | 3 |
| XXXXX | B | E | 5 |
| XXXXX | B | F | 5 |
| ... | ... | ... | ... |

Associated Data

| Traffic Info |
|---|
| H |
| I |
| J |
| K |
| L |
| ... |

EFFICIENT CASCADED LOOKUPS AT A NETWORK NODE

CROSS REFERENCE TO RELATED APPLICATION

This application is entitled to the benefit of provisional Patent Application Ser. No. 60/385,919, filed 4 Jun. 2002.

FIELD OF THE INVENTION

The invention relates to performing lookups at network nodes, and more particularly to performing cascading lookups at network nodes.

BACKGROUND OF THE INVENTION

Figure 1:
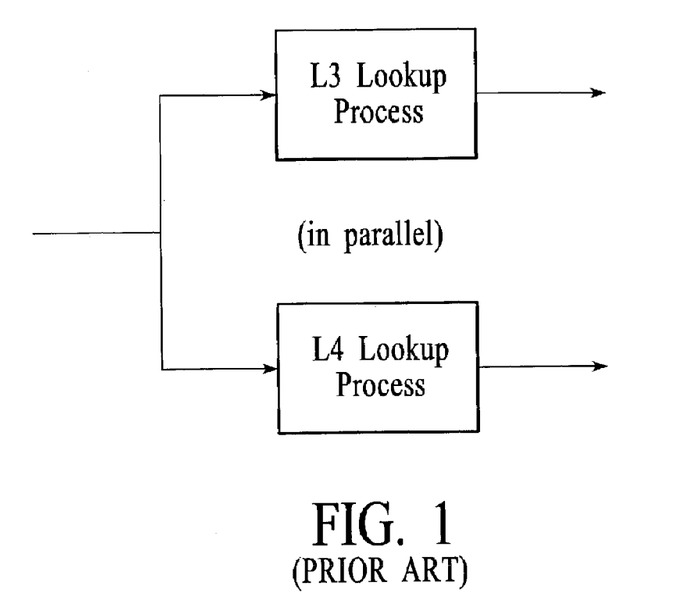
FIG. 1 shows prior art parallel L3 and L4 lookup processes.

A lookup is a data search performed within a predefined table of values. Lookups are performed frequently in the process of handling network traffic. For example, lookups may be performed in relation to a traffic distribution policy table or an access control list (ACL). In a lookup, information from incoming packets, such as header information, is used to compare against information stored in a lookup table to determine how the packet should be handled. In the process of handling network traffic, multiple lookups may be performed using information from different protocol layers, such as layer three (3) and layer four (4), where the layers are defined by the International Standards Organization (ISO) in the Open System Interconnection (OSI) model. As defined in the OSI model, layer 3 (L3) (also referred to as the network layer) is used to route data to different local area networks (LANs) and wide area networks (WANs) based on network address (i.e., destination IP address). Layer 4 (L4) (also referred to as the transport layer) can be used to ensure delivery of an entire file or message. L3 lookups are commonly performed in order to determine a next hop for the packet. L4 lookups are commonly performed to implement a traffic distribution policy or for access control. Typically, L3 lookups and L4 lookups are performed in parallel. FIG. 1 is a logical depiction of conventional L3 and L4 lookup processes that are performed in parallel on incoming traffic. The two lookups are performed independently of each other using header information that is obtained from the incoming traffic.

Figure 2:
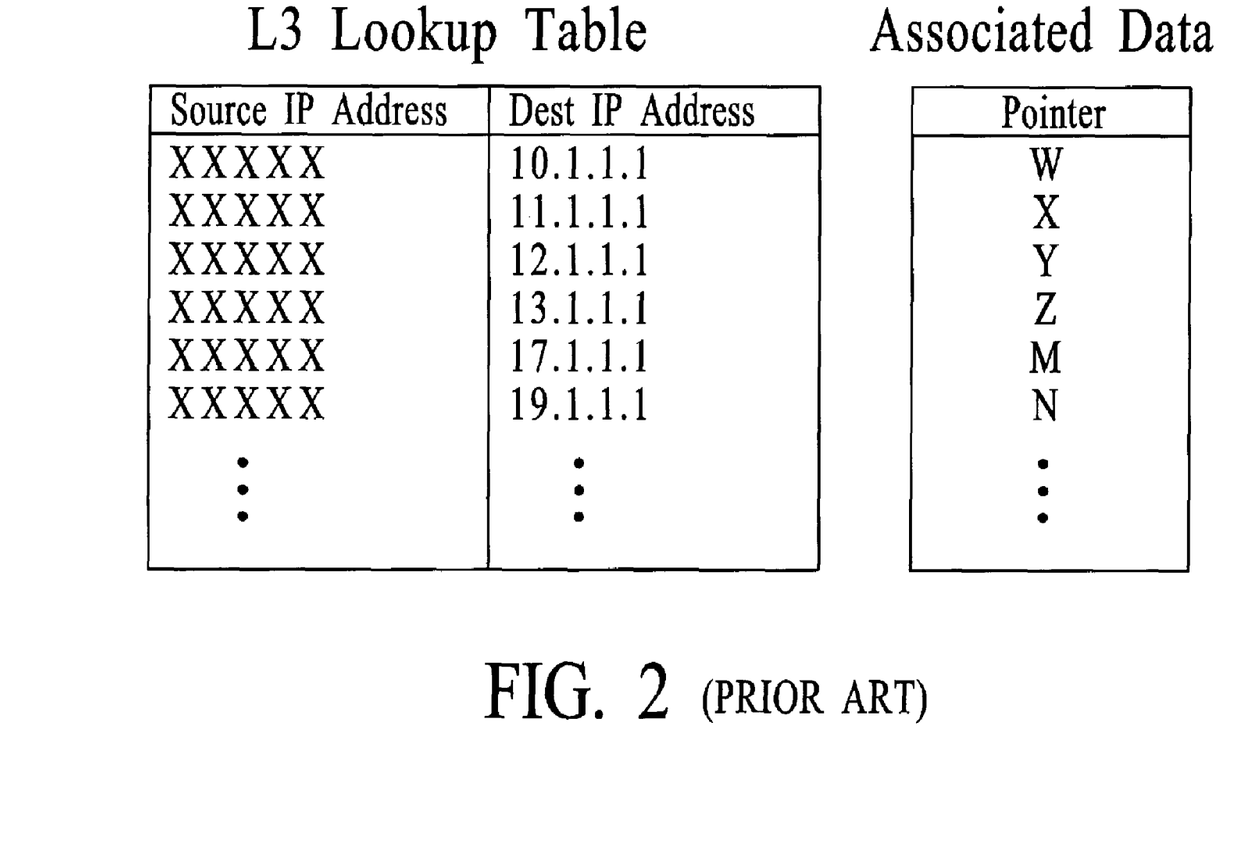
FIG. 2 shows a prior art L3 lookup table and its associated data.

FIG. 2 is an example of a lookup table (referred to as an "L3 lookup table") that is used to forward Internet Protocol (IP) traffic to the next hop. In the embodiment of FIG. 2, the search field of the lookup table includes a "Source IP Address" and a "Dest. IP Address" (destination IP address). And the results field of the lookup table includes some associated data. For example, the associated data may include next hop information and/or a pointer to another location that holds next hop information. In the embodiment of FIG. 2, the source IP address is irrelevant (as indicated by the "X" values) because incoming packets are matched solely based upon destination IP addresses.

Figure 3:
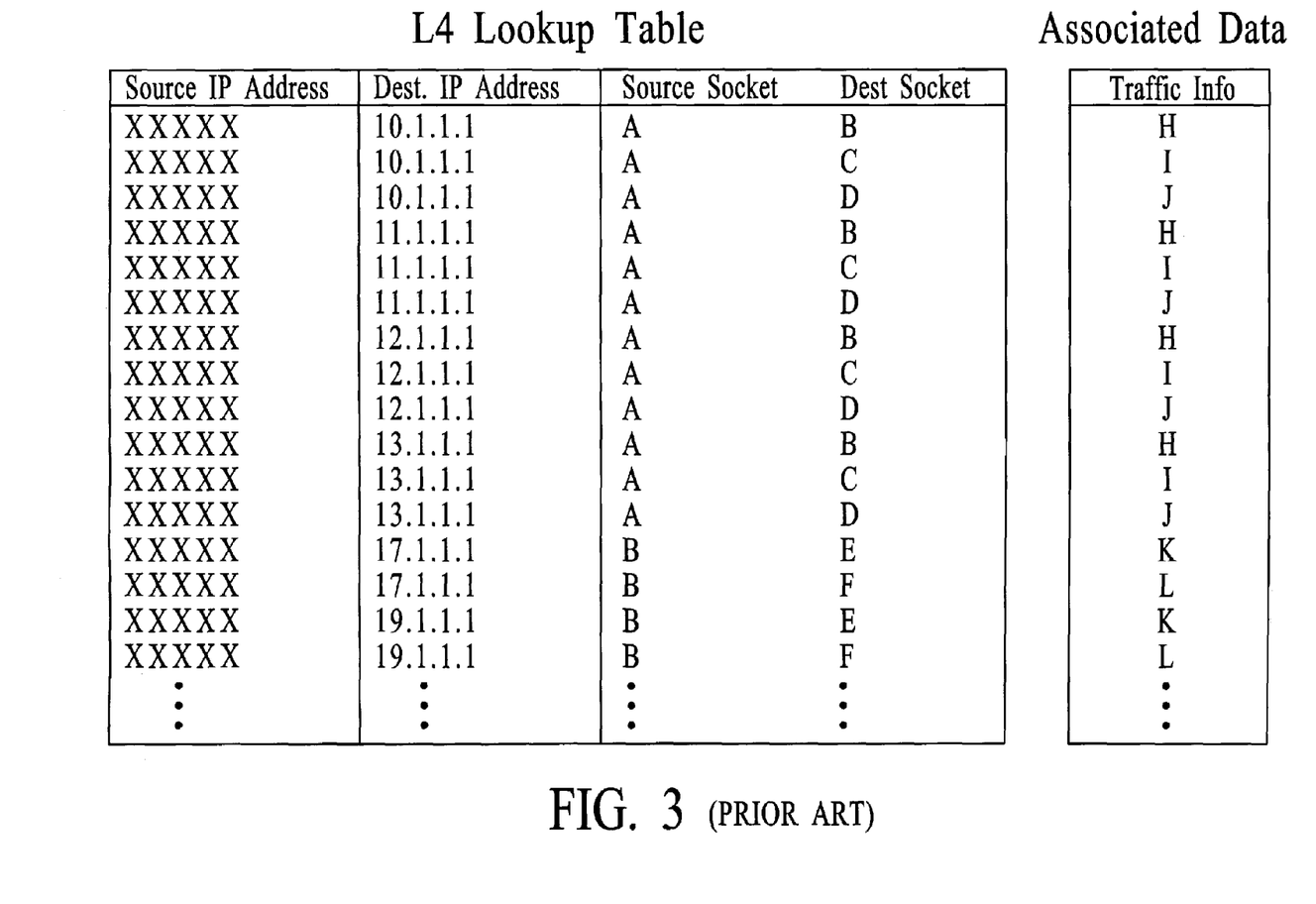
FIG. 3 shows a prior art L4 lookup table and its associated data.

FIG. 3 is an example of a lookup table (referred to as an "L4 lookup table") that is used to implement, for example, a traffic distribution policy or access control. In the embodiment of FIG. 3, the search field of the lookup table includes "Source IP Address," "Dest. IP Address" (destination IP address), "Source Socket," "Dest. Socket" (destination socket). And the results field of the lookup table includes some associated data. For example, the associated data may include next hop information for application of a traffic distribution policy or a "permit/deny" determination for access control. As stated above with reference to FIG. 1, the L4 lookup is performed in parallel with the L3 lookup. Note that the source IP address in the L4 lookup is irrelevant, in this case, because incoming packets are matched based upon destination IP address, source socket, and destination socket. Since the L4 lookup is performed in parallel with the L3 lookup, information obtained from the L3 lookup cannot be used to benefit the L4 lookup. In addition, the L4 lookup table is populated with one L4 table entry for each combination of destination IP address, source socket, and destination socket.

Some packets have particular commonalities with other packets based on L4 information. For example, multiple entries may identify the same source and destination sockets and the same associated data even though their destination IP addresses differ. For example, the first, fourth, seventh, and tenth L4 table entries (destination IP address 10.1.1.1, source socket A, destination socket B), (destination IP address 11.1.1.1, source socket A, destination socket B), (destination IP address 12.1.1.1, source socket A, destination socket B), and (destination IP address 13.1.1.1, source socket A, destination socket B) all yield the same associated data (traffic info "H"). That is, packets having these characteristics are all handled in a similar manner.

Lookup tables are often implemented in network nodes using memory such as random access memory (RAM) and/or content addressable memory (CAM). In order to implement larger lookup tables, more memory is needed. Memory in a network node is a costly resource that should be used efficiently.

Because memory is a costly resource, what is needed is an efficient technique for implementing multiple lookups in a network node.

SUMMARY OF THE INVENTION

A method for performing cascading lookups at a network node involves using first header information from a packet to search a first set of search criteria for a match, identifying a tag associated with the match, and using second header information from the packet and the tag to search a second set of search criteria for another match. The above-described method can also be implemented in a system.

Performing cascading lookups at a network node conserves memory by reducing the required number of policy entries. It also reduces the time required to reprogram the layer 4 (L4) lookup table when receiving a new packet, since if the new packet fits a traffic profile for a tag that is already represented in the L4 lookup table, a new L4 lookup table entry may not be required. Moreover, if the size of the L4 lookup table adversely effects processing time, cascading lookups may improve processing time by reducing the time required to perform L4 lookups.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 4:
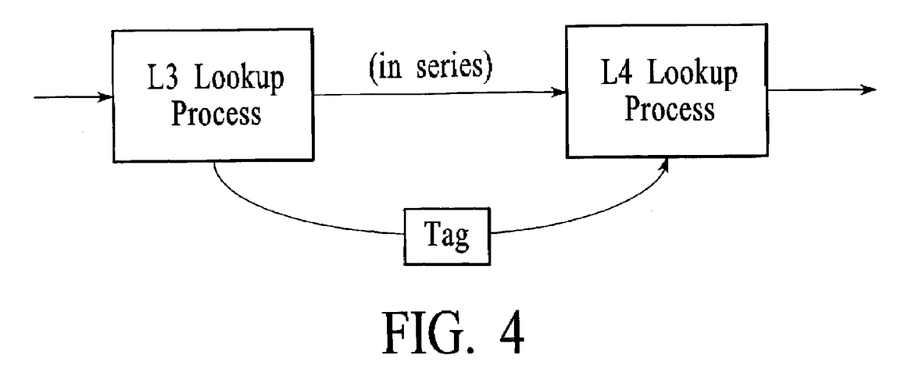
FIG. 4 is a logical depiction of serial L3 and L4 lookup processes, according to an embodiment of the invention.

FIG. 4 is a logical depiction of layer 3 (L3) and layer 4 (L4) lookup processes that are performed on incoming traffic in series, according to an embodiment of the invention. The International Standards Organization (ISO) defines L3 and L4 in the Open System Interconnection (OSI) model. In an embodiment, the L3 and L4 lookup tables may be implemented in, for example, content addressable memories (CAMs). An L4 lookup table may be, for example, an access control list (ACL) or a traffic distribution policy table. Incoming traffic comprises packets. Each packet includes a payload with one or more layers of encapsulation. As used herein, packets may be referred to as, e.g., datagrams, frames, packets, cells, and symbol streams.

Since the L3 and L4 lookups depicted in FIG. 4 are performed in series, i.e., the L3 lookup is performed before the L4 lookup is performed, information gathered during the L3 lookup associated with a packet can be utilized in the L4 lookup associated with that packet. The terms "serial" lookups, "cascaded" lookups, and "cascading" lookups are used to refer to two or more lookups that are performed in series. Because, in a cascading lookup, information gathered during the L3 lookup can be shared with the L4 lookup operation, it is possible to identify a tag as a result of an L3 lookup and use the tag in a subsequent L4 lookup. A tag may also be referred to as a label or an identifier. In an embodiment, the tag is associated with L3 header information. That is, the tag acts as a representative of L3 header information. Thus, a tag may be based upon whether the L3 header information for a packet fits a specific "traffic profile." The same tag may be associated with packets having different traffic profiles. The traffic profile, as used herein, is a set of characteristics identifiable in the header of a packet, such as a destination IP address.

FIG. 4 depicts a tag for a packet having a traffic profile that has been identified with an L3 lookup. The tag is utilized in the subsequent L4 lookup associated with the packet. The use of tags is further described below with reference to FIGS. 5-8.

Figure 5:
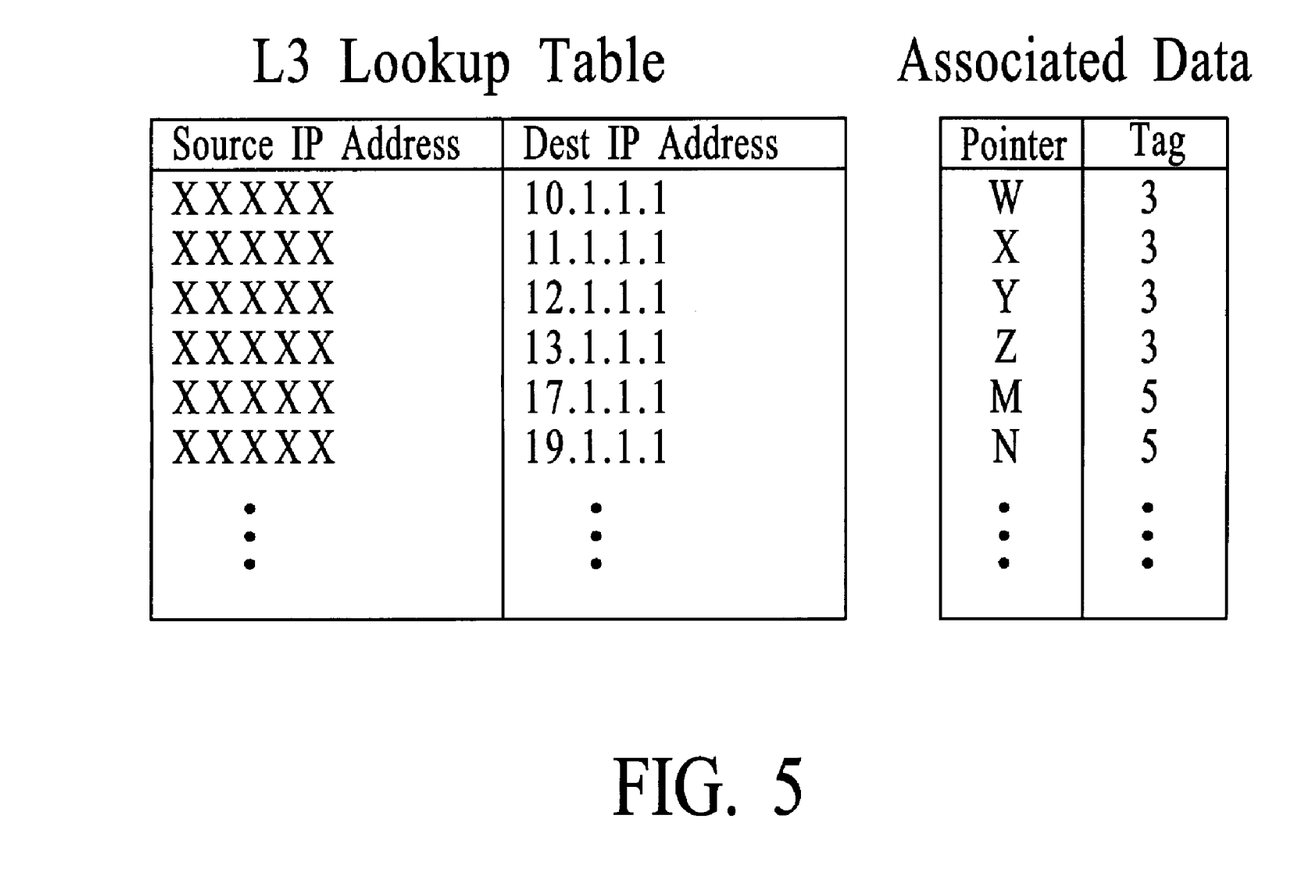
FIG. 5 illustrates an example of an L3 lookup table with associated data that includes a tag, according to an embodiment of the invention.

FIG. 5 is an example of an L3 lookup table with associated data that includes a tag, according to an embodiment of the invention. As described above with reference to FIG. 4, the L3 lookup table may be implemented in, for example, a CAM. In an embodiment, a CAM-based lookup involves identifying a search key or key from the header of a packet. In an embodiment, the search key contains data used to find matches in search criteria stored in the L3 lookup table. That is, the key is compared against entries stored in the L3 lookup table until a match, or a best match, is found. The matching entry is linked to associated data, which is provided as the L3 lookup output. In this manner, a tag is selected based upon the traffic profile of a given packet. The matching entry may also be used to identify forwarding information, in a manner that is well understood in the art of L3 packet transmission.

In an embodiment, the search criteria are data fields in the L3 lookup table. The data fields are searched using a key associated with a portion of the L3 header of a packet. Thus, a packet that fits a given traffic profile is preferably matched to a data field entry that is reflective of that traffic profile. In the L3 lookup table depicted in FIG. 5, the search criteria are "Source IP Address" and "Dest. IP Address" (destination IP address). However, these search criteria are exemplary only; other search criteria are contemplated. Note that, although the key may contain source IP address and destination IP address information, in this example the source IP address need not be considered for purposes of matching to the key, as indicated by the X's in the source IP address column. In other embodiments, the source IP address may be considered in addition to, or instead of, the destination IP address.

In the embodiment of FIG. 5, the associated data in the smaller box to the right of FIG. 5 includes pointers and tags. The pointers identify forwarding information. Note that the associated data does not include tags in the prior art embodiment depicted in FIG. 2. In the embodiment of FIG. 5, the tag solely represents L3 header information that is used for L4 lookup. However, in alternative embodiments, the tag could be associated with other header information.

In an embodiment, the same tag may be assigned to multiple incoming packets if their traffic profiles share a particular commonality. For example, the top four entries of the L3 lookup table depicted in FIG. 5 share a common tag, "3", and the bottom two entries of the L3 lookup table depicted in FIG. 5 share a different common tag, "5". The sharing of tag 3 between the top four entries and the sharing of tag 5 between the bottom two entries indicates that there is a particular commonality among the top 4 entries and a particular commonality between the bottom 2 entries. The particular commonality could be, for example, destination IP addresses belonging to the same network node or IP addresses belonging to the sub-net. In this exemplary case, destination IP addresses 10.1.1.1, 11.1.1.1, 12.1.1.1, and 13.1.1.1 may be the different IP addresses of this particular network node to which packets are forwarded. Similarly, destination IP addresses 17.1.1.1 and 19.1.1.1 may indicate destinations not on this network node. The identification of a single tag for different traffic profiles during an L3 lookup enables aggregation of L4 lookup table entries. This aggregation is described further with reference to FIGS. 6-8 below.

Figure 6:
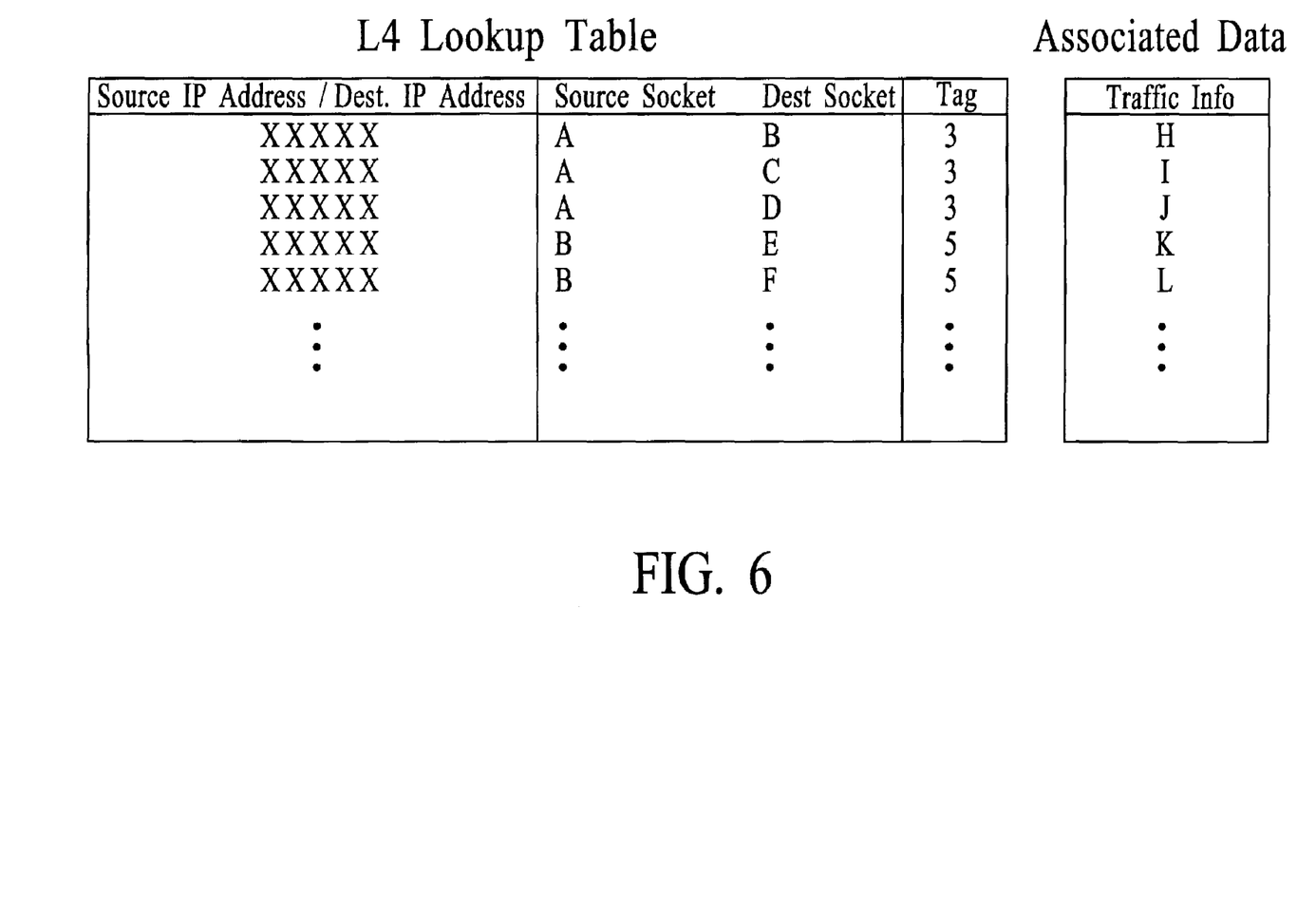
FIG. 6 illustrates an example of an L4 lookup table including tags as well as associated data, according to an embodiment of the invention.

FIG. 6 is an example of an L4 lookup table that includes the tag as a field in the search criteria, according to an embodiment of the invention. In an embodiment, the description provided with respect to FIG. 5 of how a lookup is performed using a key and a CAM-based lookup table also applies to the embodiments described with reference to FIG. 6. However, the L4 lookup table depicted in FIG. 6 has the following search criteria: "Source IP Address/Dest. IP Address" (source IP address/destination IP address), "Source Socket," "Dest. Socket" (destination socket), and "Tag". Note that the search criteria depicted in FIG. 6 are exemplary only; other search criteria are also contemplated. Also note that, in this embodiment, neither the source IP address nor the destination IP address is considered for purposes of comparison against the key (as illustrated by the X's in the Source IP Address/Dest. IP Address column of FIG. 6). Since tags that act as representatives of L3 header information are used in the L4 lookup, as described above with reference to FIG. 5, the search criteria need not include the destination IP address. This is in contrast to the prior art L4 lookup table depicted in FIG. 3, in which the destination IP address is considered for purposes of comparison against the key in the L4 lookup. Thus, in the embodiment depicted in FIG. 6, the search criteria utilized are source socket, destination socket, and tag. As used herein, sockets may also be referred to as ports (e.g., L4 ports). The source socket and destination socket identify the calling socket and called socket, respectively. Data in the tag column corresponds to the tags identified during the L3 lookups as described above with respect to FIG. 5. That is, the tags that are identified in the L3 lookup are used as search criteria for the L4 lookup along with the L4 header information (e.g., source socket). The associated data column in FIG. 6 includes traffic control information. Traffic control information may be, for example, permit/deny access information in an ACL table, quality of service information, or traffic control policy routing information, such as next hop information in a traffic distribution policy table. The traffic control information may be, for example, in the form of a pointer or direct information.

As described above with reference to FIG. 4, the use of cascading lookups and the use of tags selected during the L3 lookups enables L4 table entries to be aggregated based upon particular commonalities in traffic profiles. That is, since the two lookups are performed in series and not parallel, information (e.g., the tag) from a first lookup (e.g., the L3 lookup) can be used in a second lookup (e.g., the L4 lookup). Then, the traffic profiles that share a particular commonality can be assigned a common tag. By using a common tag, L4 table entries can be combined or aggregated. For example, in the embodiment of FIG. 6, only five L4 table entries are needed to manage the various L4 traffic profiles. This is compared to the embodiment in FIG. 3 in which there are sixteen (16) L4 table entries needed to manage the various L4 traffic profiles. The decrease in the number of L4 table entries needed is made possible by the use of cascading lookups and tags. For example, in the embodiment of FIG. 6, the first L4 table entry (source IP/destination IP: XXXXX, source socket: A, destination socket: B, tag: 3) represents the aggregation of four L4 table entries that all share the same source socket (A) and destination socket (B) and have the same associated data. The four table entries from FIG. 3 that have been aggregated into the first L4 table entry in FIG. 6 are: ((source IP: XXXXX, destination IP: 10.1.1.1, source socket: A, destination socket: B), (source IP: XXXXX, destination IP: 11.1.1.1, source socket: A, destination socket: B), (source IP: XXXXX, destination IP: 12.1.1.1, source socket: A, destination socket: B), (source IP: XXXXX, destination IP: 13.1.1.1, source socket: A, destination socket: B)). Thus, due to the use of cascading lookups and tags, fewer L4 table entries are necessary to handle the same set of traffic profiles. By reducing the number of table entries needed in an L4 lookup table, the consumption of CAM or other storage resources is reduced.

Additionally, since L4 table entries are aggregated according to a common characteristic, it is not necessary to reprogram the L4 lookup table with a new L4 table entry when new traffic is added as long as the incoming packets fit the traffic profile associated with one of the tags. For example, with respect to the example of FIG. 5, consider a new packet with L3 header information including a source IP address of XXXXX and a destination IP address of 14.1.1.1. If the new packet shares a particular commonality with the first four L3 table entries in the L3 lookup table (i.e., (source IP address: XXXXX, destination IP address: 10.1.1.1), (source IP address: XXXXX, destination IP address: 11.1.1.1), (source IP address: XXXXX, destination IP address: 12.1.1.1), and (source IP address: XXXXX, destination IP address: 13.1.1.1)), then the new packet could be given a new L3 table entry with a corresponding tag=3 as associated data. However, there would be no need for an additional L4 lookup table entry as long as the combination of the tag and the corresponding L4 header information (e.g., source socket and destination socket) corresponds to one of the existing entries. For example, if the new L4 traffic profile is: source IP/destination IP: XXXXX, source socket: A, destination socket: B, plus the corresponding tag=3, then there is no need for a new L4 table entry, because such an entry is already present in the L4 lookup table. Therefore, using cascaded lookups and tags can reduce the number of modifications that are required in the L4 table. These modifications take time and hardware resources, which are very expensive at wire-speed forwarding.

It shall be understood that the embodiments described above with reference to FIGS. 4-6 disclose L3 and L4 lookups for purposes of example only. The embodiments described with reference to FIGS. 4-9 apply to any searches of different sets of search criteria using header information. It shall also be understood that the tag referred to in the embodiments described with reference to FIGS. 4-9 can be used for more than one search. For example, the same tag could be used for both an ACL table lookup and a policy table lookup.

Figure 7:
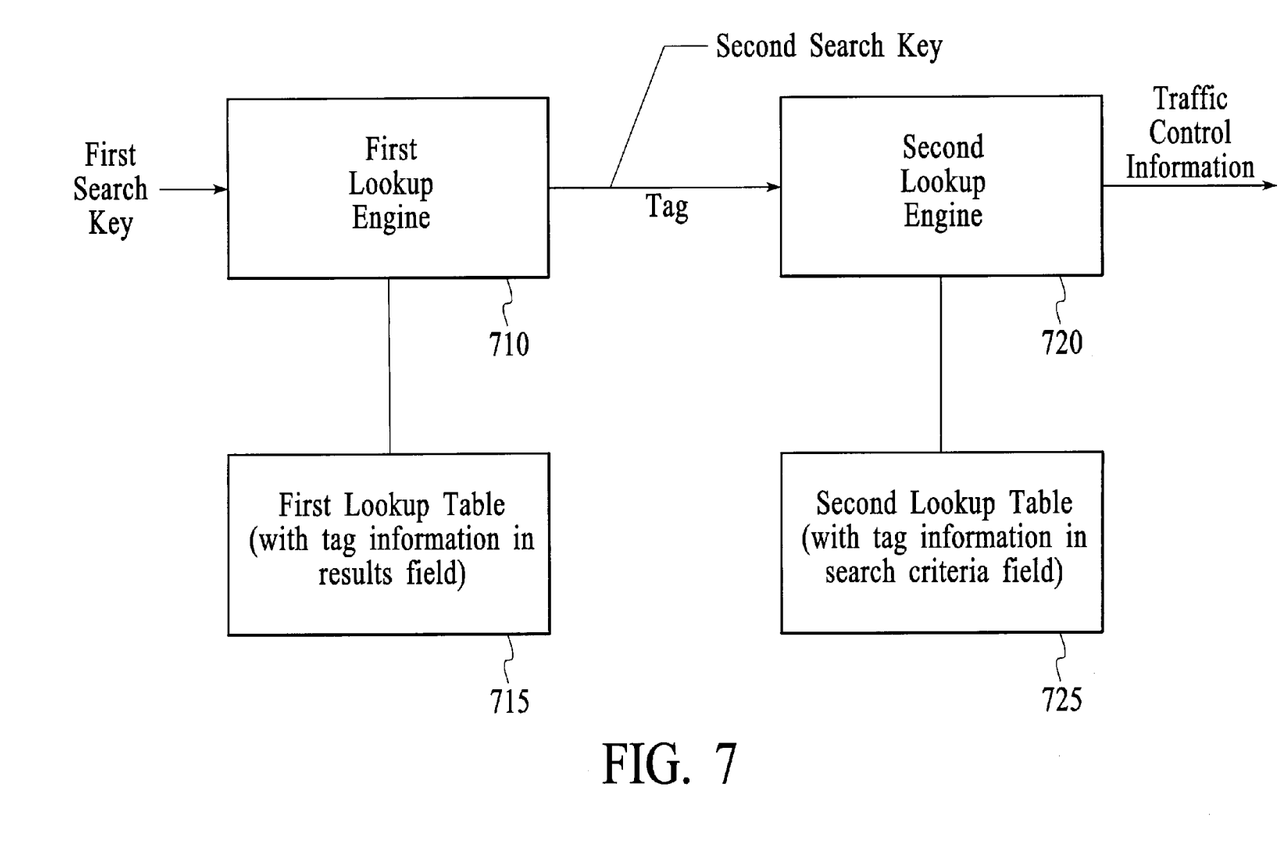
FIG. 7 illustrates a system for performing a lookup at a network node, according to an embodiment of the invention.

FIG. 7 illustrates a system for performing a lookup at a network node, according to an embodiment of the invention. In the embodiment depicted in FIG. 7, the system includes a first lookup engine 710, a first lookup table 715, which has tag information in a results field, a second lookup engine 720, and a second lookup table 725, which has tag information in a search criteria field.

The first lookup engine 710 is configured to receive a first search key relating to a packet. The first lookup engine, which is coupled to the first lookup table 715, searches the first lookup table using the first key. The first lookup table contains search criteria against which the first key is compared. Additionally, the first lookup table contains tag information in its results field. Thus, when a match is found in the first lookup table, a tag is associated with the corresponding packet.

The second lookup engine 720 is configured to receive a second search key relating to the incoming packet. The second search key includes the tag. The second lookup engine, which is coupled to the second lookup table 725, searches the second lookup table using the second key. Entries in the second lookup table include a tag as part of the search criteria. To match an entry in the second lookup table, the key must have a tag that matches the tag that is part of the search criteria for the entry. In an embodiment, when a match is found in the second lookup table, traffic control information is output.

Figure 8:
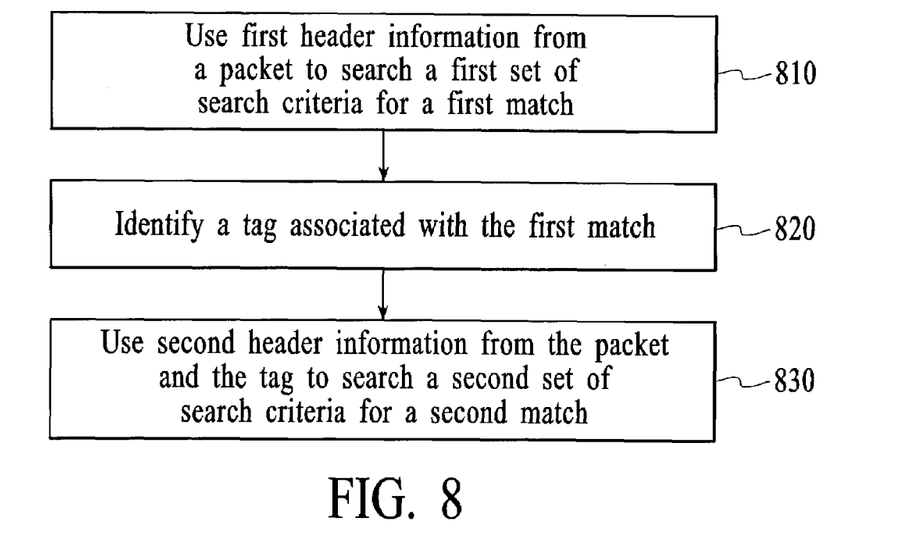
FIG. 8 is a flow diagram of a method for performing a lookup at a network node, according to an embodiment of the invention.

FIG. 8 is a flow diagram of a method for performing a lookup at a network node, according to an embodiment of the invention. At block 810, first header information from a packet is used to search a first set of search criteria for a first match. At block 820, a tag associated with the first match is identified. At block 830, second header information from the packet and the tag are used to search a second set of search criteria for a second match.

Figure 9:
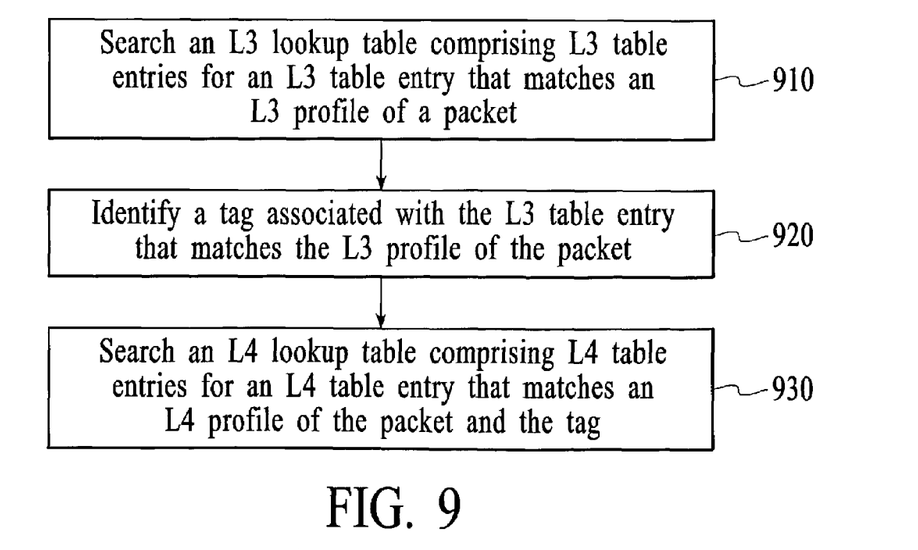
FIG. 9 is a flow diagram of an alternative method for performing a lookup at a network node, according to an embodiment of the invention.

FIG. 9 is a flow diagram of another method for performing a lookup at a network node, according to an embodiment of the invention. At block 910, an L3 lookup table comprising L3 table entries is searched for an L3 table entry that matches an L3 profile of a packet. At block 920, a tag associated with the L3 table entry that matches the L3 profile of the packet is identified. At block 930, an L4 lookup table comprising L4 table entries is searched for and L4 table entry that matches an L4 profile of the packet and the tag.

In one embodiment, the methods described above are embodied in a computer-readable media as computer instruction code. It shall be appreciated that not all methods steps described must be performed, nor must they be performed in the order stated.

Although specific embodiments of the invention have been described and illustrated, the invention is not to be limited to the specific forms or arrangements of parts as described and illustrated herein. The invention is limited only by the claims.

What is claimed is:

1. A method for performing a lookup at a network node comprising:
    associating multiple entries in a first set of search criteria with a same tag, wherein said multiple entries correspond to different traffic profiles; and
    establishing a single entry in a second set of search criteria that provides associated data for said multiple entries in said first set of search criteria with said same tag, wherein said single entry in said second set of search criteria includes said tag as search criteria;
    using first header information from a packet to search a first set of search criteria for a first match;
    identifying said tag associated with said first match;
    using second header information from said packet and said tag to search a second set of search criteria for a second match.

2. The method of claim 1 wherein said tag is valid for traffic with a particular commonality.

3. The method of claim 1 further comprising associating multiple entries in said first set of search criteria with a same tag, wherein said multiple entries correspond to different traffic profiles.

4. The method of claim 3 further comprising establishing a single entry in said second set of search criteria that provides associated data for said multiple entries in said first set of search criteria with said same tag, wherein said single entry in said second set of search criteria includes said tag as search criteria.

5. The method of claim 1 wherein said first header information includes layer three (L3) information.

6. The method of claim 5 wherein said second header information includes layer four (L4) information.

7. The method of claim 1 wherein said first and second sets of search criteria are stored in content addressable memory (CAM).

8. The method of claim 1 further comprising using said first match to identify forwarding information.

9. The method of claim 8 wherein said forwarding information includes layer three (L3) information.

10. The method of claim 1 further comprising using said second match to identify traffic control information.

11. The method of claim 10 wherein said traffic control information includes traffic control policy routing information.

12. A method for performing a lookup at a network node comprising:
    associating multiple entries in a L3 lookup table with a same tag, wherein said multiple entries correspond to different traffic profiles; and
    establishing a single entry in a L4 lookup table that provides associated data for said multiple entries in said L3 lookup table with said same tag, wherein said single entry in said L4 lookup table includes said tag as search criteria;
    searching said layer three (L3) lookup table comprising L3 table entries for an L3 table entry that matches L3 header information of a packet;
    identifying said tag associated with said L3 table entry;
    searching said layer four (L4) lookup table comprising L4 table entries for an L4 table entry that matches L4 header information of said packet and said tag.

13. The method of claim 12 wherein said tag is associated with all L3 table entries that match packets having a certain profile.

14. The method of claim 12 wherein said searching said L3 lookup table and said searching said L4 lookup table are performed in series.

15. The method of claim 12 wherein said L3 and L4 lookup tables are implemented in content addressable memory (CAM).

16. The method of claim 15 wherein said L4 lookup table includes an access control list (ACL).

17. The method of claim 15 wherein said L4 lookup table includes a policy table.

18. A system for performing lookups at a network node, comprising:
    a first content addressable memory (CAM)-based lookup table that has associated data, said first CAM-based lookup table including a tag field as part of said associated data;
    a first lookup engine configured to receive first search keys related to packets and to search said first CAM-based lookup table using said first search keys;
    a second CAM-based lookup table that includes search criteria, said second CAM-based lookup table including a tag field as part of said search criteria; and
    a second lookup engine configured to receive second search keys related to said packets and to search said second CAM-based lookup table using said second search keys, wherein said second search keys include tags;
    wherein:
        multiple entries in said first CAM-based lookup table are associated with a same tag, wherein said multiple entries correspond to different traffic profiles; and
        a single entry in said second CAM-based lookup table is established that provides associated data for said multiple entries in said first CAM-based lookup table with said same tag, wherein said single entry in said second CAM-based lookup table includes said tag as search criteria.

19. The system of claim 18, wherein said first lookup engine search and said second lookup engine search are performed in series.

20. The system of claim 18, wherein said first lookup table includes L3 information as search criteria.

21. The system of claim 18, wherein said second lookup table includes L4 information as search criteria.

22. A system for performing a lookup at a network node comprising:
    a first lookup engine configured to receive a first search key relating to a packet and to search a first lookup table using said first search key, said first lookup table comprising first lookup table search criteria entries, a first lookup table search criteria entry of said first lookup table search criteria entries being associated with a tag as a result field, wherein a match between said first search key and said first lookup table search criteria entry yields said tag; and
    a second lookup engine configured to receive a second search key relating to said packet, wherein said second search key includes said tag, said second lookup engine also configured to search a second lookup table using said second search key, said second lookup table comprising second lookup table search criteria entries, a second lookup table search criteria entry of said second lookup table search criteria entries including said tag as part of said search criteria for said second lookup table search criteria entry; wherein said first and second lookup tables are implemented in content addressable memory (CAM);

wherein:

multiple entries in said first lookup table are associated with a same tag, wherein said multiple entries correspond to different traffic profiles; and a single entry in said second lookup table is established that provides associated data for said multiple entries in said first lookup table with said same tag, wherein said single entry in said second lookup table includes said tag as search criteria.

23. The system of claim 22 wherein said tag is associated with all first table entries that match packets having a certain profile.

24. The system of claim 22 wherein said searching said first lookup table and said searching said second lookup table are performed in series.

* * * * *